Oct. 27, 1959 A. W. CARLSON 2,910,596

NON-SATURATING TRANSISTOR RING COUNTER

Filed Aug. 3, 1955 3 Sheets-Sheet 1

INVENTOR.
ARTHUR WILLIAM CARLSON
BY Wade Koontz and
Donald C Keabeney
ATTORNEYS

Oct. 27, 1959 A. W. CARLSON 2,910,596

NON-SATURATING TRANSISTOR RING COUNTER

Filed Aug. 3, 1955 3 Sheets-Sheet 2

INVENTOR.
ARTHUR WILLIAM CARLSON
BY Wade Koontz and
Donald C Keaveney
ATTORNEYS

Oct. 27, 1959 A. W. CARLSON 2,910,596

NON-SATURATING TRANSISTOR RING COUNTER

Filed Aug. 3, 1955 3 Sheets-Sheet 3

INVENTOR.
ARTHUR WILLIAM CARLSON
BY Wade Koontz and Donald C Keaveney
ATTORNEYS

United States Patent Office 2,910,596

Patented Oct. 27, 1959

2,910,596

NON-SATURATING TRANSISTOR RING COUNTER

Arthur William Carlson, Arlington, Mass., assignor to the United States of America as represented by the Secretary of the Air Force Application August 3, 1955, Serial No. 526,336

7 Claims. (Cl. 307—88.5)

(Granted under Title 35, U.S. Code (1952), sec. 266)

The invention described herein may be manufactured and used by or for the United States Government for governmental purposes without payment to me of any royalty thereon.

The present invention relates to a non-saturating transistor ring counter circuit which extends the application of the basic principles and advantages disclosed in my copending application, Serial Number 446,687, now Patent No. 2,843,761, issued July 15, 1958, entitled "High Speed Transistor Flip-Flops," to generalized ring counter circuits.

It is an object of the present invention to provide a transistor ring counter circuit in which only one stage may be in the "on" state at any given time and in which the "on" transistor is not saturated. This eliminates the hole storage effects associated with the saturated condition which effects in turn limit to a low value the speed with which transistors may be switched from the "on" to the "off" state.

It is a further and a resulting object of the invention to provide such a transistor ring counter circuit which is capable of operating at speeds higher than can be achieved with previously known transistor ring counters.

These objects are achieved by providing a ring counter circuit having a common emitter connection for all stages thus insuring that only one stage may be in the "on" state at any given time, and by limiting the emitter current to a value such that the "on" transistor is not saturated. Non-saturated operation eliminates the hole storage effects associated with the saturated condition and thus permits the circuit to operate at a repetition rate faster than that of previously known circuits.

These and other objects and advantages will be more fully understood from the following specification and drawings forming a part thereof wherein like reference characters refer to like parts throughout and in which.

Figure 1:
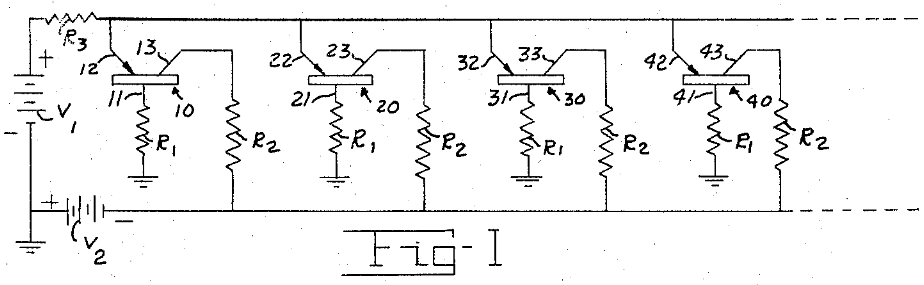
Figure 1 is a schematic illustrating the basic circuit principles.
Figure 4:
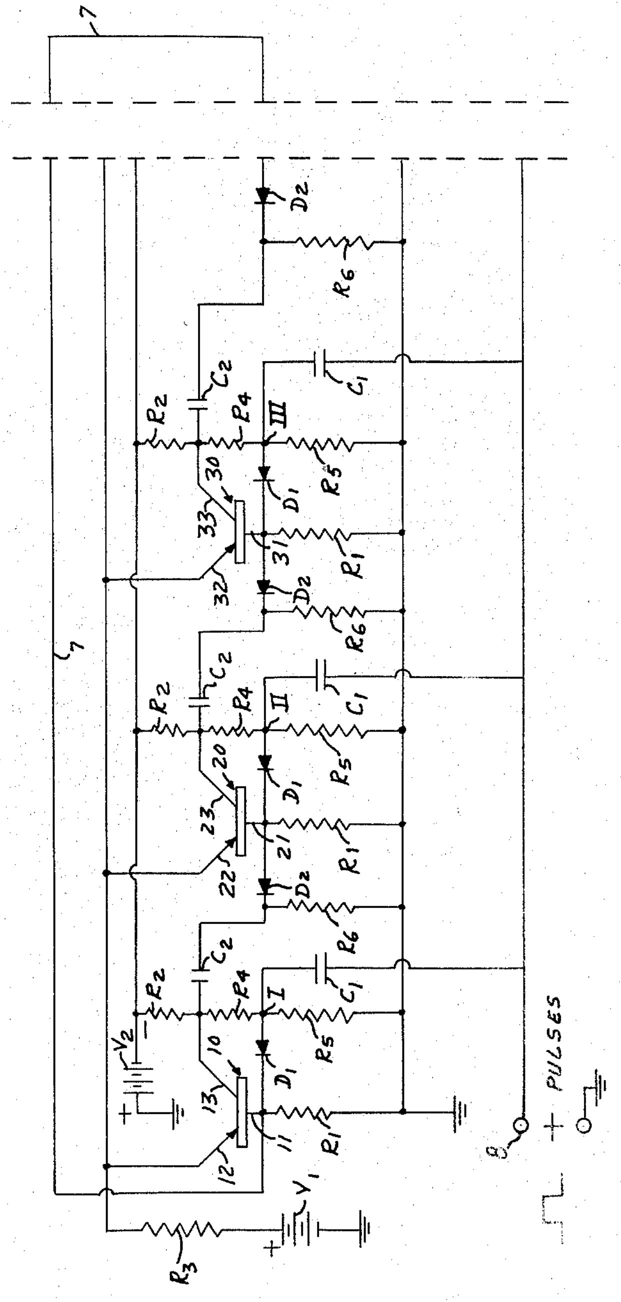
Figure 4 is a schematic diagram of the ring counter circuit showing means of shifting the count.

Referring now to the drawings, Figure 1 schematically illustrates the basic ring circuit in chain form but does not include the pulse applying or count shifting means shown in the more practical embodiment of Figure 4. In Figure 1 transistors 10, 20, 30 and 40 are preferably N-type point contact transistors having base connections 11, 21, 31 and 41, emitter connections 12, 22, 32 and 42 and collector connections 13, 23, 33 and 43 respectively. Resistors $R_1$ are connected between the base and ground of each transistor to insure that a negative resistance exists between emitter and ground. $R_2$ is the collector load resistance connected between the collector of each transistor and the collector power supply $V_2$. $V_1$ and $R_3$ approximate a current source connected to the emitters of the transistors. In Figure 1 the circuit is shown as a nonterminating chain for purposes of illustration and discussion. A practical embodiment of a ring circuit is shown in Figure 4.

Figure 2:
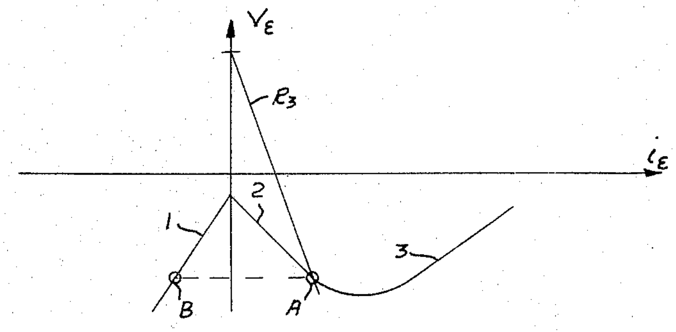
Figure 2 is a graph of the emitter characteristic of one transistor.

From Figures 1–3 it can be shown as follows that only one transistor can be on at any one time. Consider first the emitter characteristics of one of the transistors such as 10 as shown in Figure 2 with the load $R_3$ returned to $V_1$ also plotted. Segment 1 is the cutoff region, segment 2 is the active or negative resistance region, and segment 3 is the saturation region. The intersection of the $R_3$ load line with the characteristic determines an operating point at A at which the transistor may be on but not saturated. All other transistors are off. The emitters of all other transistors are at the same potential as that of the "on" transistor because of the common connections and since they have similar characteristics will be off as at point B.

Figure 3:
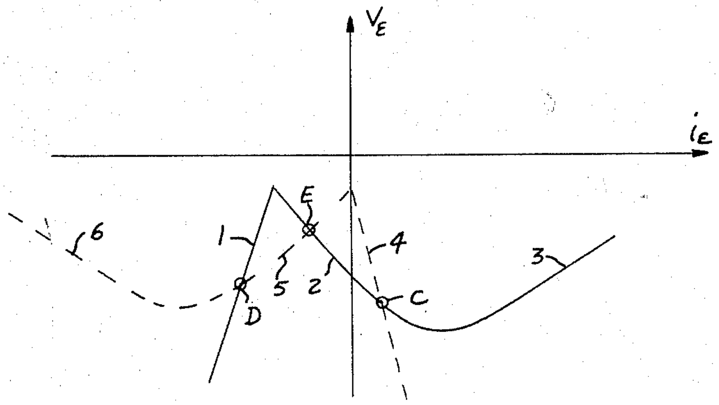
Figure 3 is a graph of emitter characteristics considering one transistor as the load line of another.

That in fact two transistors can not be on at the same time may be seen by referring to Figure 3. Consider two transistors such as 10 and 20 connected as shown in Figure 1. Since the magnitudes of $V_1$ and $R_3$ are such as to approximate a current source, their effect is to shift the emitter characteristic segments 1, 2 and 3 to the left along the $i_e$ axis. One transistor may be considered as the load of the other with voltage $V_1$ and $R_3$ connected to the emitter. The curve for the transistor such as 20 representing the load is obtained by rotating its emitter characteristic 180 degrees about the voltage axis to become the load line for the first transistor. This is shown in Figure 3 as the dashed curve in which segment 4 is the cutoff region, segment 5 is the negative resistance region and segment 6 is the saturation region. Possible operating points are determined as is well known by the intersection of the load line, here 4, 5, 6, with the characteristic, here 1, 2, 3. Such intersection points are shown at C, D, and E. At point C the load transistor is off and the first transistor is on but not saturated. At point D the load transistor is on but not saturated, and the first transistor is off. Point E is the intersection of two negative resistance regions and is not a stable operating point. Thus, the possible operating points resulting from the common emitter connection insure that no two transistors can be on at the same time and that the transistor which is on can not operate in the saturated region.

Typical illustrative values of the elements shown in Figure 1 to produce the characteristics shown in Figure 3 for type 1698 transistors are $R_1$, 750 ohms; $R_2$, 2400 ohms; $R_3$, 13,000 ohms; $V_1$, 20 v.; $V_2$, 30 v.

The circuit of Figure 1 becomes a counter by providing means to shift the on state of the transistors to the next transistor by means of a pulse. One means of accomplishing this is shown in Figure 4 wherein the break lines indicate that any desired number of identical stages may be used and wherein elements corresponding to those of Figure 1 have the corresponding reference characters. In addition to these elements each stage is provided with a voltage divider $R_4$—$R_5$ connected between the collector and ground; with a diode $D_1$ connected between the base of each transistor and the junction points I, II, III, etc. of each voltage divider $R_4$, $R_5$; wtih a coupling capacitor $C_1$ connected between points I, II, III, etc. and a positive pulse input terminal 8; with a coupling capacitor $C_2$ and resistor $R_6$ connected in series between the collector and ground; and with a diode $D_2$ connected between the junction point of $C_2$ and $R_6$ in one stage and the base of the transistor of the following stage. Lead 7 may couple the last stage to the first to form a ring circuit.

The circuit of Figure 4 operates as follows. Consider the transistor 10 in the first stage to be "on." Then point I is at a higher potential than points II and III because of voltage dividers $R_4$, $R_5$. Thus the diode $D_1$ of the first "on" stage has less reverse bias than that of any other stage. Therefore when a positive trigger pulse is applied it will pass through $C_1$ and through diode $D_1$ in the forward direction to the base of transistor 10. The trigger pulse always goes to the base of the transistor that is in the "on" state for the reasons given above. The positive pulse then turns the first stage "off." The negative going step at the collector of the first stage is coupled through capacitor $C_2$ and diode $D_2$ to the base of the transistor in the next or second stage thus turning transistor 20 "on." $R_6$ is required to restore the charge on $C_2$. The next trigger pulse operates in a similar manner to turn "off" transistor 20 which in turn causes transistor 30 to turn "on." Thus successive trigger pulses pass the "on" state down the chain of counter stages and ultimately back to the first transistor which is connected by lead 7 from its base to the diode $D_2$ of the last stage to form the ring circuit. Of course, if lead 7 is omitted the circuit becomes simply a chain counter.

Typical values which may be used for high speed operation of the circuit of Figure 4 are, for example, as follows: $R_1$, 750 ohms; $R_2$, 2400 ohms; $R_3$, 13,000 ohms; $R_4$, 5600 ohms; $R_5$, 13,000 ohms; $R_4$, 5600 ohms; $C_1$ and $C_2$, 75 mmf.; $D_1$ and $D_2$, 1N34; transistors type 1698 with cutoffs of 3 megacycles or greater. Using elements having the values indicated above an eight stage ring counter has been constructed and operated with pulses having a one megacycle repetition rate.

Figure 5:
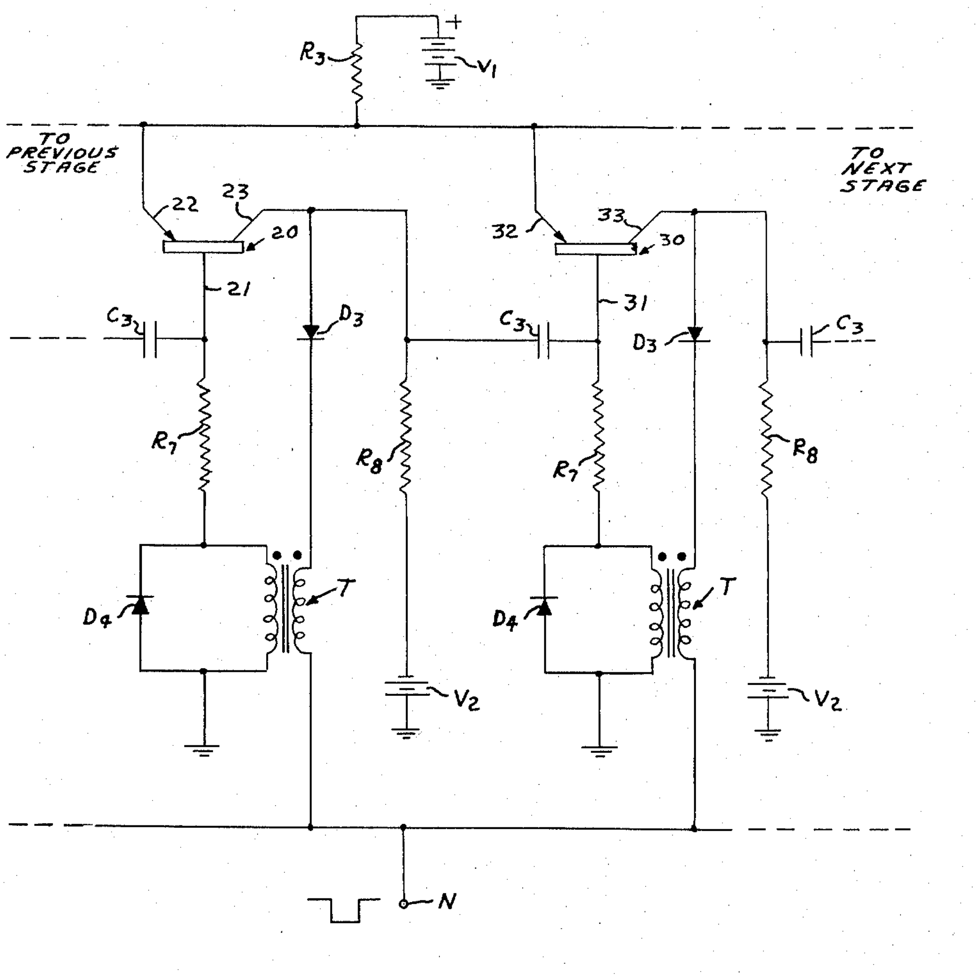
Figure 5 is a schematic diagram of a second embodiment of count shifting means shown in a section of a ring counter circuit.

In Figure 5 there is shown a schematic diagram of a second embodiment of count shifting means in a section of a ring counter circuit according to the present invention. Components corresponding to those of Figures 1 and 4 again have the same reference characters applied. In addition to these components there is provided a source N of negative pulses which are coupled to each transistor stage by pulse transformers T. The primary of each transformer has one end connected to source N and the other end connected through a diode $D_3$ to the collector electrode of the transistor. The secondary of the transformer has one end connected to ground and the other end connected through a base resistor $R_7$ to the base electrode of the transistor. A diode $D_4$ is connected across the secondary of the transformer to prevent ringing and to insure stability. The collector electrode of each transistor is connected by a resistor $R_8$ to the collector power supply $V_2$ and by a capacitor $C_3$ to the base electrode of the following stage.

The circuit of Figure 5 operates as follows:

The negative trigger pulse passes through the primary of the pulse transformer, the diode connected to the collector of the "on" transistor and the condenser connected to the base of the next stage. A positive pulse appears at the base of the "on" transistor due to the transformer action while at the same time a negative pulse is produced at the base of the next stage across the base resistor. The positive pulse at the base of the "on" transistor turns this transistor "off" and the negative going collector waveform is coupled by the condenser reinforcing the negative pulse at the base of the next stage turning the next stage on. The pulse transformers used consist of two 30 turn windings on a small ⅜" diameter ferrite ring. Using transistors having an $f_{co}$ of greater than 3 mc. a ring of 8 was operated with 2 mc. triggers. The diodes across the secondaries of the pulse transformers are to prevent ringing in the transformers by preventing negative overshots. They are also necessary for the stability of the circuit because if the transformers were permitted to ring, the circuit would trigger falsely and might multivibrate.

In an illustrative operative embodiment of the circuit the components may have the following values: $C_3$ 50 mmf.; $R_3$ 13K; $R_7$ 470 ohms; $R_8$ 2.4K; $V_1$ 20 v.; $V_2$—30 v.

Thus I have provided a ring counter circuit having a common emitter connection for all stages which insures that only one stage may be in the "on" state at any given time. The emitter current in the ring counter is limited to a value such that the "on" transistor is not saturated. This eliminates the hole storage effects associated with the saturated condition which effects in turn limit to a low value the speed with which a transistor may be switched from one state to another. By operating the transistors in the nonsaturated state and by obtaining a circuit in which only one stage may be "on" at any time, the circuit may be operated at a repetition rate at least five times faster than previous circuits utilizing transistors having similar characteristics.

While an illustrative embodiment of the invention has been described in detail it is understood that modifications may be made within the spirit and scope of the invention.

What I claim is:

1. In a transistor counter circuit, a plurality of transistors each having a body, a base electrode, an emitter electrode and a collector electrode in point contact with said body, a collector voltage supply having one of its two terminals grounded, a first independent load impedance connected between each of said collector electrodes and the ungrounded terminal of said collector voltage supply, a second independent impedance connected between ground and each of said base electrodes, said second impedance being operative in cooperation with said body to produce a negative resistance between each of said emitter electrodes and ground, a source of substantially constant current, a common connection from each of said emitter electrodes to one terminal of said current source, the other terminal of said current source being grounded, said current source being of such a magnitude as to bias said transistors to an operating point in a nonsaturated region of their characteristics, an independent capacitor connected between each of said collector electrodes and the base electrode of the next succeeding transistor, and control circuit means to apply control pulses to said base and collector electrodes.

2. A non-saturating transistor ring counter circuit comprising, a plurality of transistors each having a body, a base electrode, an emitter electrode and collector electrode in point constant with said body, a collector voltage supply having one of its two terminals grounded, a first independent load impedance connected between each of said collector electrodes and the ungrounded terminal of said collector voltage supply, a second independent impedance connected between ground and each of said base electrodes, said second impedance being of such a magnitude as to be operative in cooperation with said body to produce a negative resistance between each of said emitter electrodes and ground, a source of substantially constant current, a common low impedance connection from each of said emitter electrodes to one terminal of said current source, the other terminal of said current source being grounded, said current source being of such magnitude as to bias said transistors to an operating point in the non-saturated negative resistance region of their characteristics when said transistors are in the "on" state and to the cutoff region of their characteristics when they are in the "off" state, a source of voltage pulses, circuit means to couple said voltage pulses to at least one electrode of any transistor which is in the "on" state, and coupling means connected between the collector electrode of each transistor and the base electrode of the immediately following transistor in the ring circuit.

3. In a transistor counter circuit, a plurality of transistors each having at least an emitter, a base, a collector, a base impedance connected between the base and ground and a collector impedance connected to the collector, a collector voltage supply, one terminal of each of said collector impedances being connected to one terminal of said collector voltage supply, the other terminal of said collector voltage supply being grounded, a voltage source and an impedance constituting a current source, the emitter electrodes of the several transistors being directly connected in parallel to said current source, the other terminal of said current source being grounded, a capacitor connected in series circuit relation between the collector electrodes of the several transistors and the base of the next succeeding transistor and circuit means simultaneously applying a control impulse to the base and collector electrodes as voltage steps of opposite polarity.

4. A non-saturating transistor ring counter circuit comprising, a plurality of transistors each having a body, a base electrode, an emitter electrode and collector electrode in point contact with said body, a collector voltage supply having one of its two terminals grounded, a first independent load impedance connected between each of said collector electrodes and the ungrounded terminal of said collector voltage supply, a second independent impedance connected between ground and each of said base electrodes, said second impedance being of such a magnitude as to be operative in cooperation with said body to produce a negative resistance between each of said emitter electrodes and ground, a source of substantially constant current, a common low impedance connection from each of said emitter electrodes to one terminal of said current source, the other terminal of said current source being grounded, said current source being of such magnitude as to bias said transistors to an operating point in the non-saturated negative resistance region of their characteristics when said transistors are in the "on" state and to the cutoff region of their characteristics when they are in the "off" state, a source of voltage pulses, a voltage divider connected between the collector of each transistor and ground, a diode connected between the base electrode of each transistor and a point on the respective voltage divider which provides a reverse bias for each diode, a capacitor connected between said point on said voltage divider and said source of voltage pulses and coupling means connected between the collector of each transistor and the base of the immediately following transistor in the ring circuit.

5. A non-saturating transistor ring counter circuit comprising, a plurality of transistors each having a body, a base electrode, an emitter electrode and collector electrode in point contact with said body, a collector voltage supply having one of its two terminals grounded, a first independent load impedance connected between each of said collector electrodes and the ungrounded terminal of said collector voltage supply, a second independent impedance connected between ground and each of said base electrodes, said second impedance being of such a magnitude as to be operative in cooperation with said body to produce a negative resistance between each of said emitter electrodes and ground, a source of substantially constant current, a common low impedance connection from each of said emitter electrodes to one terminal of said current source, the other terminal of said current source being grounded, said current source being of such magnitude as to bias said transistors to an operating point in the non-saturated negative resistance region of their characteristics when said transistors are in the "on" state and to the cutoff region of their characteristics when they are in the "off" state, a source of voltage pulses, a voltage divider connected between the collector electrode of each transistor and ground, a diode connected between the base of each transistor and an intermediate point on the respective voltage divider, a capacitor connected between said point and said source of voltage pulses, circuit means including a capacitor and a diode connecting the collector of each transistor and the base of the immediately following transistor in the ring circuit and a resistor connected from the junction between said capacitor and diode to ground.

6. In a transistor counter circuit, a plurality of transistors, each of said transistors including at least a body, a base electrode on said body, an emitter electrode and a collector electrode in point contact with said body, a collector voltage supply having its positive terminal grounded, a first independent load impedance connected between each of said collector electrodes and the negative terminal of said collector voltage supply, a second independent impedance connected between each of said base electrodes and ground, said second impedance being operative in cooperation with said body to produce a negative resistance between each of said emitter electrodes and ground, an emitter voltage supply, the negative terminal of said emitter voltage supply being grounded, a third impedance connected to the positive terminal of said emitter voltage supply, the magnitude of said emitter voltage supply and said third impedance being such as to approximate a constant current source, a common low impedance connection from each of said emitter electrodes to the positive terminal of said constant current source, control circuit means connected to apply control pulses of opposite polartiy to the base electrode and collector electrode of each of said transistors, and circuit means connecting each collector electrode to the base electrode of the next succeeding transistor.

7. A non-saturating transistor ring counter circuit comprising a plurality of transistors each having a body, a base electrode on said body, an emitter electrode and collector electrode in point constant with said body, a collector voltage supply having one of its two terminals grounded, a first independent load impedance connected between each of said collector electrodes and the ungrounded terminal of said collector voltage supply, a second independent impedance connected between ground and each of said base electrodes, said second impedance being of such a magnitude as to be operative in cooperation with said body to produce a negative resistance between each of said emitter electrodes and ground, a source of substantially constant current, a common low impedance connection from each of said emitter electrodes to one terminal of said current source, the other terminal of said current source being grounded, said current source being of such magnitude as to bias said transistors to an operating point in the non-saturated negative resistance region of their characteristics when said transistors are in the "on" state and to the cutoff region of their characteristics when they are in the "off" state, a source of control voltage pulses, control circuit means for each of said transistors including a pulse transformer having primary and secondary windings, one end of said primary being connected to said source of voltage pulses and the other end being connected through a diode to the collector electrode of said transistors, one end of said secondary being grounded and the other end being connected through said second independent impedance to the base electrode of said transistor and a diode connected across said transformer secondary, coupling means including a capacitor connected from the junction point of said second independent load impedance at the collector electrode of said transistor to the base electrode of the next following transistor in said ring circuit.

References Cited in the file of this patent

UNITED STATES PATENTS

| | | |
|---|---|---|
| 2,591,961 | Moore et al. | Apr. 8, 1952 |
| 2,594,336 | Mohr | Apr. 29, 1952 |
| 2,703,368 | Wrathall | Mar. 1, 1955 |
| 2,787,712 | Priebe et al. | Apr. 2, 1957 |

OTHER REFERENCES

The Proceedings of the I.E.E. (British), vol. 101, part III, No. 73, September 1954, pp. 298–303, "The Transistor Regenerative Amplifier as a Computer Element," Chaplin.